(12) United States Patent
Debolt et al.

(10) Patent No.: US 7,325,795 B2
(45) Date of Patent: Feb. 5, 2008

(54) ENGINE MOUNT

(75) Inventors: John T. Debolt, Angola, IN (US); Didier T. Emin, Fort Wayne, IN (US)

(73) Assignee: Cooper-Standard Automotive Inc., Novi, MI (US)

( * ) Notice: Subject to any disclaimer, the term of this patent is extended or adjusted under 35 U.S.C. 154(b) by 0 days.

(21) Appl. No.: 11/359,854

(22) Filed: Feb. 22, 2006

(65) Prior Publication Data

US 2006/0138720 A1 Jun. 29, 2006

Related U.S. Application Data

(63) Continuation of application No. 10/403,952, filed on Mar. 31, 2003, now abandoned.

(51) Int. Cl.
*F16F 13/00* (2006.01)
(52) U.S. Cl. .................................. 267/140.13; 267/219
(58) Field of Classification Search ........... 267/140.13, 267/140.11, 219; 248/532, 636
See application file for complete search history.

(56) References Cited

U.S. PATENT DOCUMENTS

| | | | |
|---|---|---|---|
| 4,583,723 A * | 4/1986 | Ozawa | 267/140.14 |
| 4,588,173 A | 5/1986 | Gold et al. | |
| 4,783,063 A | 11/1988 | Probst et al. | |
| 4,858,879 A * | 8/1989 | Miyamoto et al. | 267/140.13 |
| 4,932,636 A | 6/1990 | Phillips et al. | |
| 4,997,169 A * | 3/1991 | Nakamura et al. | 267/140.13 |
| 5,005,810 A | 4/1991 | Sawada et al. | |
| 5,295,671 A * | 3/1994 | Nakagaki et al. | 267/140.13 |
| 5,775,666 A * | 7/1998 | Tsukamoto et al. | 267/140.13 |
| 5,964,456 A | 10/1999 | Someya | |
| 6,443,438 B2 * | 9/2002 | Satori et al. | 267/140.13 |
| 6,499,729 B1 | 12/2002 | Walterbusch | |
| 6,550,753 B2 * | 4/2003 | Takashima et al. | 267/140.13 |
| 6,557,839 B2 | 5/2003 | Tanaka | |
| 6,592,109 B2 * | 7/2003 | Yamaguchi et al. | 267/140.11 |

* cited by examiner

*Primary Examiner*—Robert A. Siconolfi
*Assistant Examiner*—Mariano Sy
(74) *Attorney, Agent, or Firm*—Fay Sharpe LLP

(57) ABSTRACT

An improved and tight package vibration isolator assembly increases the strength of the mount structure without compromising the efficiency of the damping features. An exo-skeleton bracket design provides a rigid structural strength able to withstand extreme loads. The bracket also allows forces to bypass the fluid components of the damping assembly that are otherwise subject to potential passage of forces therethrough. The exo-skeleton bracket provides a stiff structure that substantially surrounds the damping assembly. Tuning of the assembly is also simplified through use of a travel limiter assembly, the cross-section of which may change in shape, or characteristics of a surrounding resilient sleeve selectively altered, to tune the damping characteristics of the damping assembly.

16 Claims, 15 Drawing Sheets

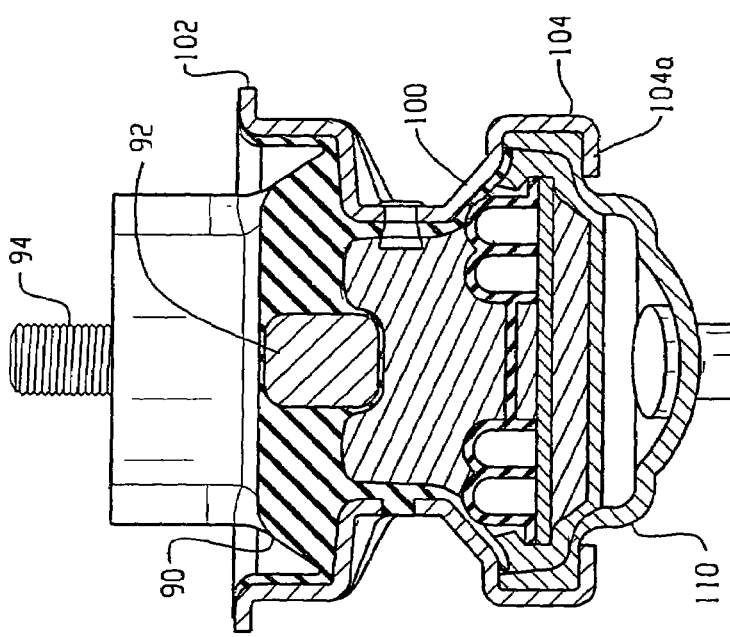
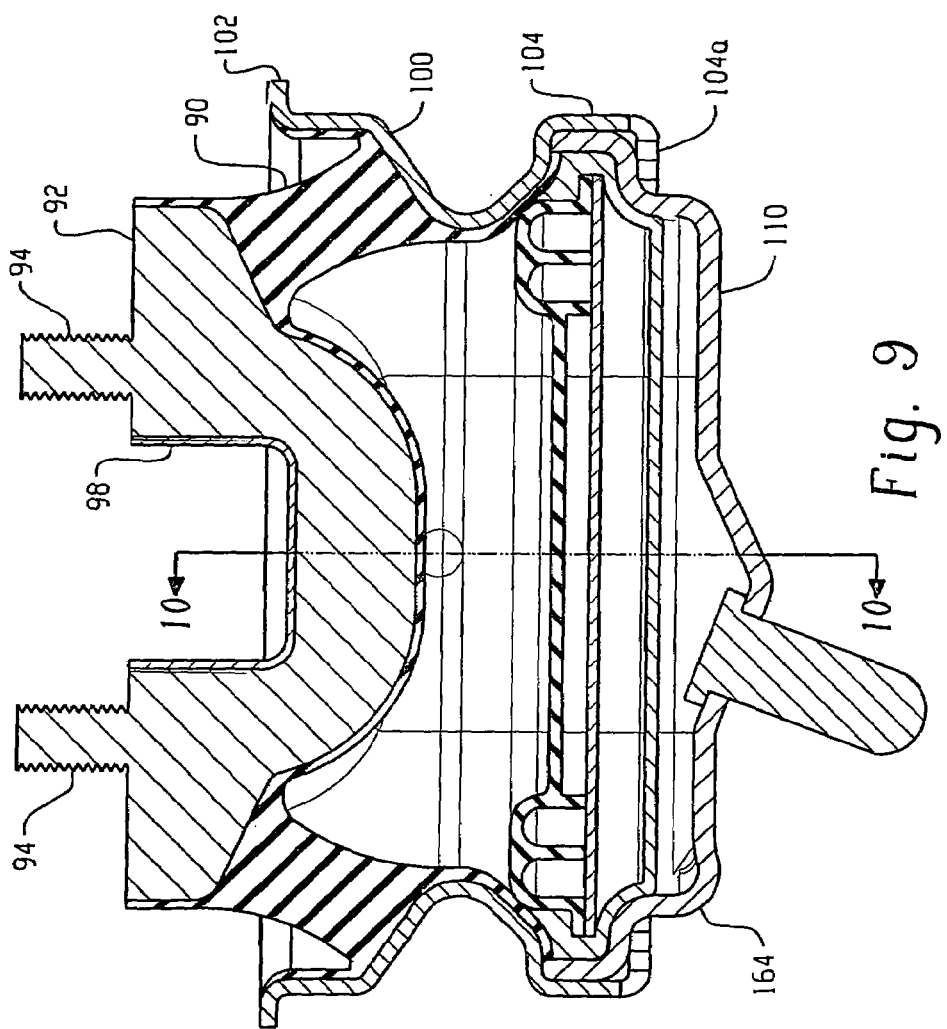
Fig. 10
Fig. 9

ENGINE MOUNT

BACKGROUND OF THE INVENTION

This application is a continuation application of U.S. Ser. No. 10/403,952, filed Mar. 31, 2003, now abandoned.

Engine mounts are generally well known in the industry and typically employ a combination of elastomeric and/or hydraulic features that provide effective vibration isolation. The performance of the mount is directly connected to the volume of rubber and the clearance around it. Both are required for optimal isolation and rough load powertrain handling. The space constraints also must address the need for access tool clearance and assembly process feasibility.

Moreover, there are various constraints imposed in this environment. For example, space or packaging is a primary concern as designs are required to deliver the same performance in smaller dimensional constraints. High temperature exposure is another constraint. For example, the mount design must be capable of withstanding an excursion temperature on the order of 175° C. Another constraint relates to high load conditions, especially for truck applications, where the mount must be capable of handling peak loads on the order of 10G. Still another constraint is the ability to provide a mount that can be easily tuned and preferably one that uses many of the same mount components, including a modular type of design that allows components or a subassembly to be added or removed as an option, resulting in ease of manufacture in developing different stiffnesses and force/displacement relationships as desired.

Tradeoffs between these constraints have tended to limit the various mount designs brought to the marketplace. For example, packaging space tends to discourage use of a heavy metal bracket, or sophisticated design driven by the hydraulic technology; however, part durability must be carefully considered if a heavy metal bracket is not used. A tradeoff also exists between developing the proper rubber geometry that provides the desired stiffness and durable rubber deformed shape required for a typical truck mount load, and at the same time designing the fluid related components of the mount in order to establish the requisite fluid effect that produces the high level of damping needed in, for example, truck applications.

U.S. Pat. No. 6,499,729 provides a concise discussion of ways in which the industry has addressed the need for a stiffer sealing/crimping area. These current applications are loading through the crimp region or crimp area of the mount, that is, the mount is directly supported or mounted through the cover. Since the cover is intended to carry the load, an increased emphasis is required on the sealing or crimping area in order to maintain a hydraulic or fluid-tight seal between the chamber and a reservoir. Thus, attention is directed to enhancing the perimeter or edge portion of the seal where the load transfer through the mount cover interfaces with the diaphragm/bellows arrangement.

It is also desirable to maximize the length of the track path on the inertia track of a hydromount. Maximizing the track path length provides sufficient fluid effect to produce a high level of damping required in extreme load conditions such as encountered with a truck application. The inertia space and the need for high fluid damping have not been adequately addressed in the prior art.

Because of the need to transfer forces or extreme loads through the mount, use of alternative materials of construction has been limited. Extreme loads typically require the mount structure to be at least partially, if not entirely, formed of metal to withstand extreme loads. For example, typical hydromounts use the inertia track as a travel limiter or a structural reinforcement in order to stop powertrain motion in compression and likewise reach higher modal frequencies. Therefore, it is conventional to form the inertia track from metal.

Still another problem encountered with prior arrangements is that the mount is usually secured to a vehicle flange along a large planar area. It has been determined that the planar interface is another potential area of rattling or secondary resonation.

SUMMARY OF THE INVENTION

Improved isolation and improved powertrain handling/restriction in rough road conditions are provided with the vibration isolator assembly or mount of the present invention. The assembly meets restricted packaging space constraints and extreme load conditions while providing high mode frequencies.

An exemplary embodiment of the invention includes a structural exo-skeleton bracket secured to one of associated first and second surfaces of a vehicle. A damping assembly is received in the exo-skeleton and thereby protected from transferred loads or forces by the exo-skeleton bracket.

The damping assembly preferably includes an elastic wall having a major portion thereof received in the exo-skeleton.

The bracket supports a travel limiter. The bracket is strengthened at selected regions to support the travel limiter and the bracket configured so that a continuous surface extends from the support regions to the first or second surface of the vehicle.

The travel limiter includes a resilient portion that tunes the force versus displacement ratio of the vibration isolator assembly.

The damping assembly includes a fluid subassembly having an inertia track, a diaphragm and a cover plate that divides the subassembly into first and second sub-chambers.

The inertia track has a channel extending through a circuitous path that reverses through approximately 180° multiple times between opposite ends of the channel.

A punctual contact is formed in a shell of the fluid mount to provide abutting engagement with one of the associated first and second surfaces and limit vibration between the mount and the surface.

A primary benefit of the invention resides in the increased structural strength necessary to handle extreme loads and insure high mode frequencies.

Another benefit of the invention resides in the effective vibration damping in a restricted packaging space.

Yet another benefit is realized by the transmission of forces around or outside of the mount subassembly.

Still other benefits and advantages of the invention will become apparent to one skilled in the art upon reading and understanding the following detailed description.

BRIEF DESCRIPTION OF DRAWINGS

FIG. 9 is a longitudinal cross-section of the assembly of FIG. 8.

FIG. 10 is a cross-sectional view taken generally along lines 10-10 of FIG. 9.

DETAILED DESCRIPTION OF THE INVENTION

Figure 1:
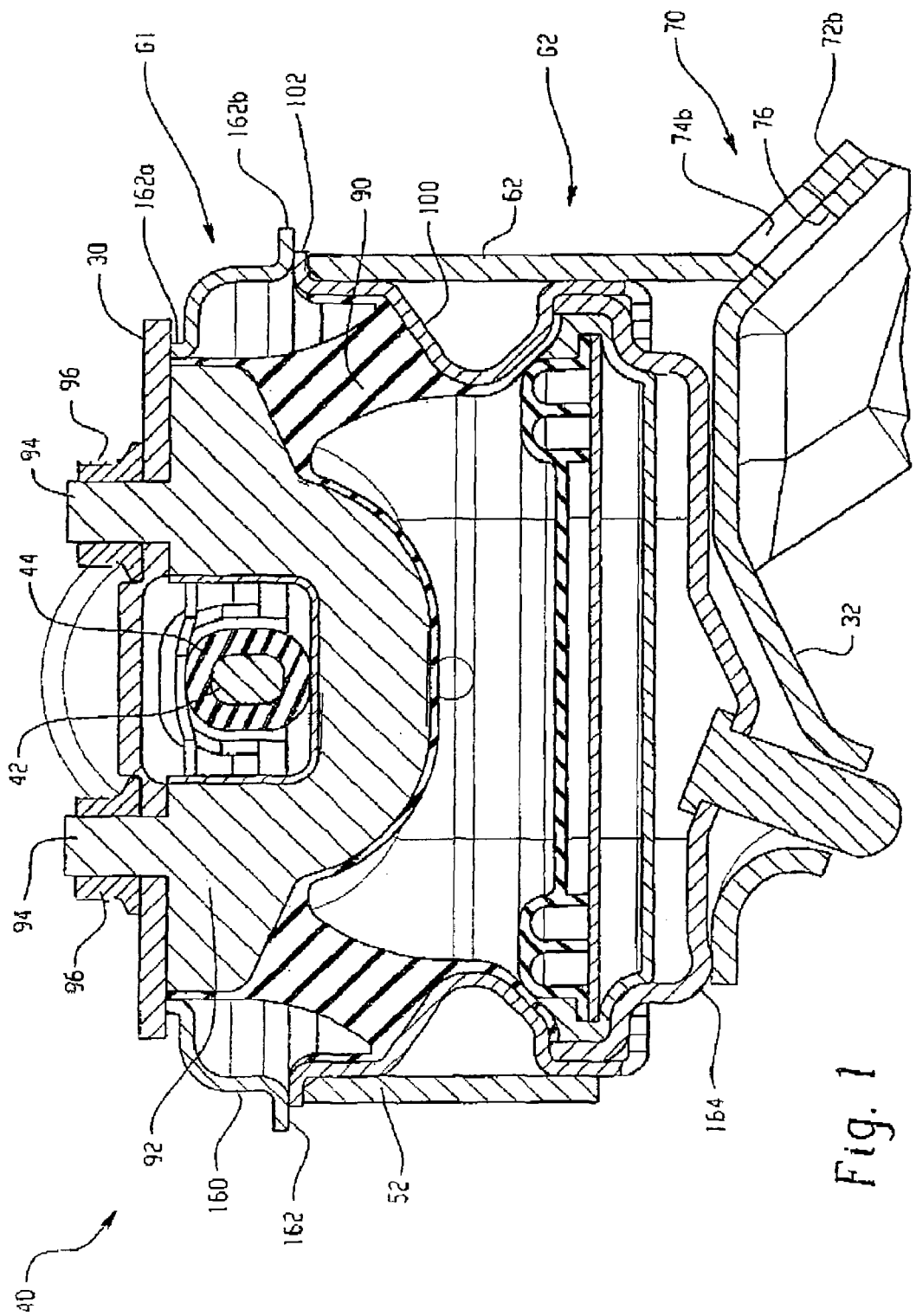
FIG. 1 is a longitudinal cross-section of a vibration isolator assembly or engine mount formed in accordance with the present invention mounted in a vehicle.

Turning first to FIG. 1, first and second surfaces 30, 32 of a vehicle (such as a truck) are shown in spaced relation with a vibration damper assembly, hydromount assembly, or engine mount 40 interposed between the associated surfaces that are adapted for movement relative to one another. More particularly, the vibration isolator assembly 40 by design includes two major portions in accordance with the present invention. The assembly is divided into a first group G1 comprised of features needed to produce the required rates, including all of the tunable features used to obtain damping characteristics. A second group G2 is composed of structural strength features needed to withstand extreme loads, including frame interface features.

Figure 2:
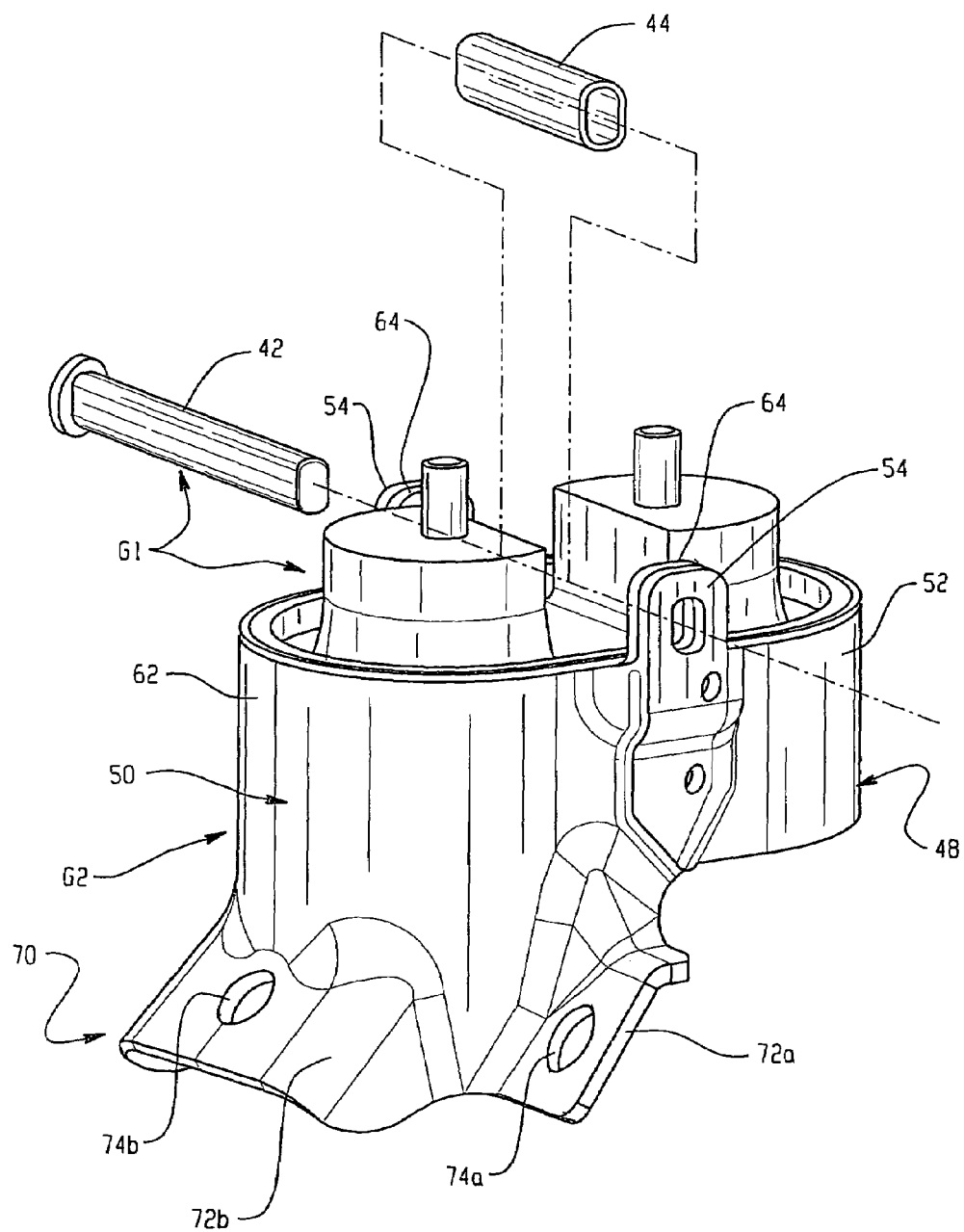
FIG. 2 is a perspective view of the assembly of FIG. 1 with the travel limiter shown in disassembled relation.
Figure 3:
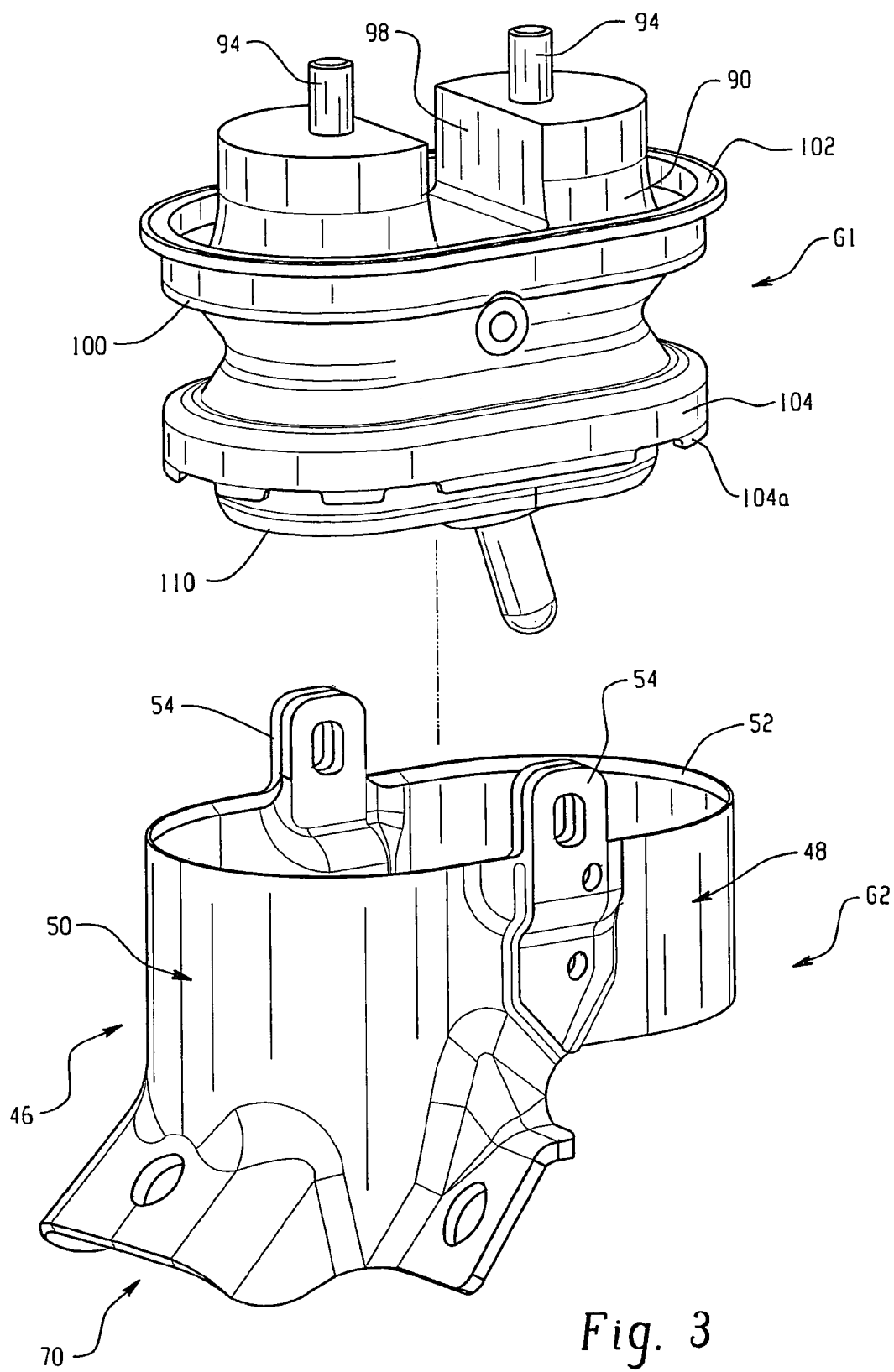
FIG. 3 is an exploded, perspective view of the engine mount comprised of the bracket assembly and the damping assembly.

More particularly, and with additional reference to FIGS. 2 and 3, the damping assembly G1 includes a travel limiter having an elongated pin 42 with a generally rectangular cross-section (typically a round cross-section in prior art arrangements) and an elastic sleeve 44 received therearound. The tuning and damping structure and functions of the pin and sleeve assembly, i.e., the travel limiter, will be described in greater detail below. The structural strength features of the damping assembly are primarily provided by a bracket 46 that is assembled, e.g., welded, from first and second bracket portions 48, 50, as a unitary assembly. The bracket defines an exo-skeleton or peripheral structural frame particularly useful in carrying the load conditions. The first bracket portion 48 defines approximately one-half of the peripheral, elliptical shape of the bracket. It includes a curved wall portion 52 dimensioned for metal-to-metal engagement with selected portions of the tuning/damping portion G1 of the assembly as will be described below. In plan view, the first bracket portion defines a generally U- or C-shaped conformation in which the extended height of the curved wall portion 52 receives a major portion of the damping assembly. First and second travel limiter support portions or tabs 54 are provided at terminal ends of the curved wall portion 54 (also see FIGS. 4-6). Each support portion 54 includes an elongated opening 56 that receives a limited axial length of the travel limiter pin 42 therethrough.

The second bracket portion 50 also includes a curved wall portion 62 having an axial height that mates with the curved wall portion 52 of the first bracket portion and also receives a major portion of the damping assembly therein. The curved wall portion 62 similarly includes travel limiter support portions or tabs 64, preferably at terminal, upper ends of the second bracket portion. Like the travel limiter support portions 54 on the first bracket portion, these mounting tabs include openings 66 in the second bracket portion that also receive a limited axial extent of the travel limiter and resilient sleeve. Thus, as will be appreciated from FIGS. 4 and 5, when the first and second bracket portions 48, 50 are secured together, such as by welding along seam 68, the support portions and particularly the openings 56, 66 thereof are aligned in mating arrangement for receipt of the travel limiter pin and resilient sleeve (FIG. 2).

The bracket is mounted to one of the first and second associated surfaces of the vehicle. More particularly, a means for securing or mounting 70 the bracket to the associated second surface is defined by angled flange portions 72a-72c integrally formed with and extending from the curved wall portion 62. Each flange portion 72a-72c includes a respective mounting opening 74a-74c. The mounting openings are located for mating engagement with respective mounting openings in the associated surface 32 of the vehicle as represented by opening 76 (FIG. 1). As will be appreciated, the spaced locations of the mounting holes 74a-74c, particularly where opening 74b is in a different plane from the remaining two mounting openings, provides a secure interconnection with the surface of the vehicle. Likewise, the individual flange portions 72a-72c are nonplanar so as to match and provide optimized stability to the mounting arrangement with the surface of the vehicle.

Figure 4:
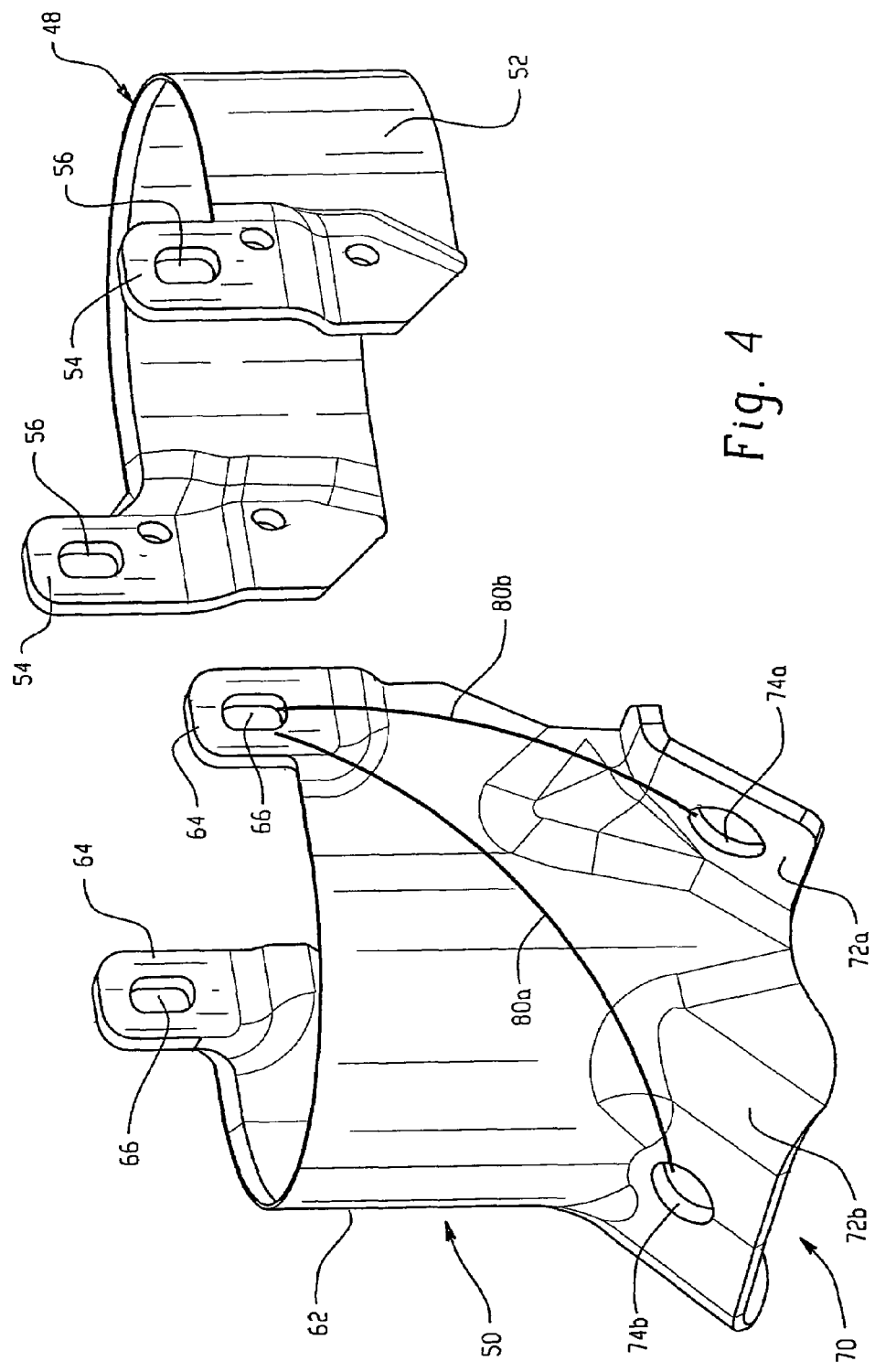
FIG. 4 is perspective view of the bracket disassembled into first and second bracket portions.
Figure 5:
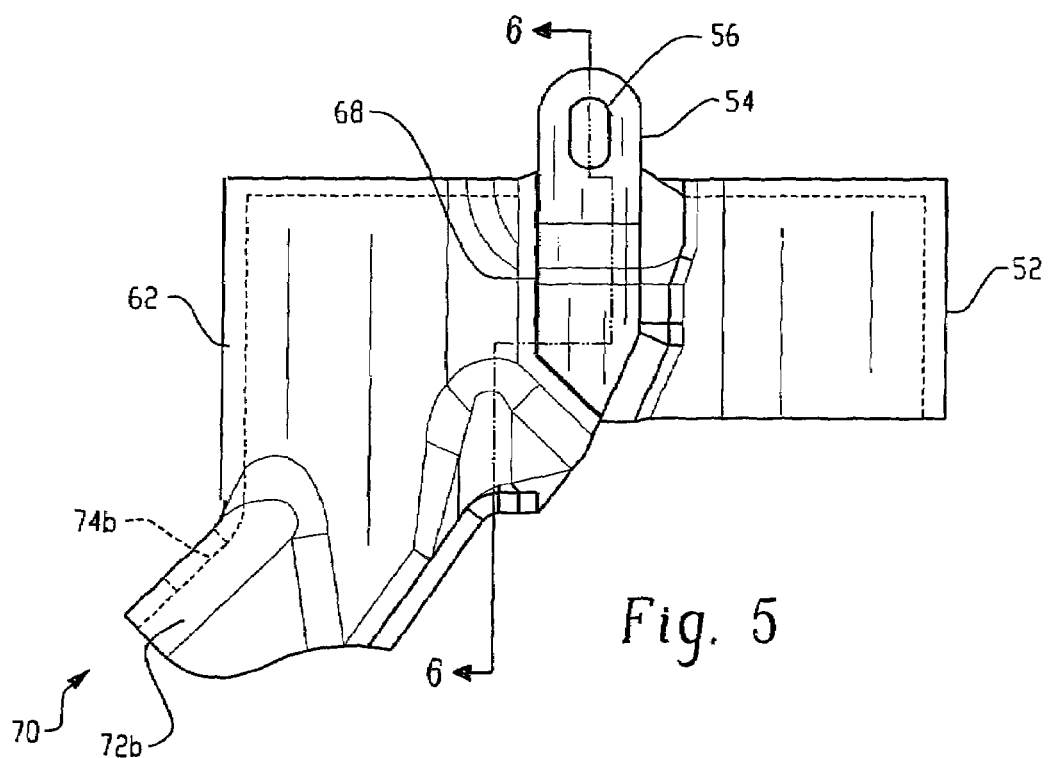
FIG. 5 is an elevational view of the assembled bracket.
Figure 6:
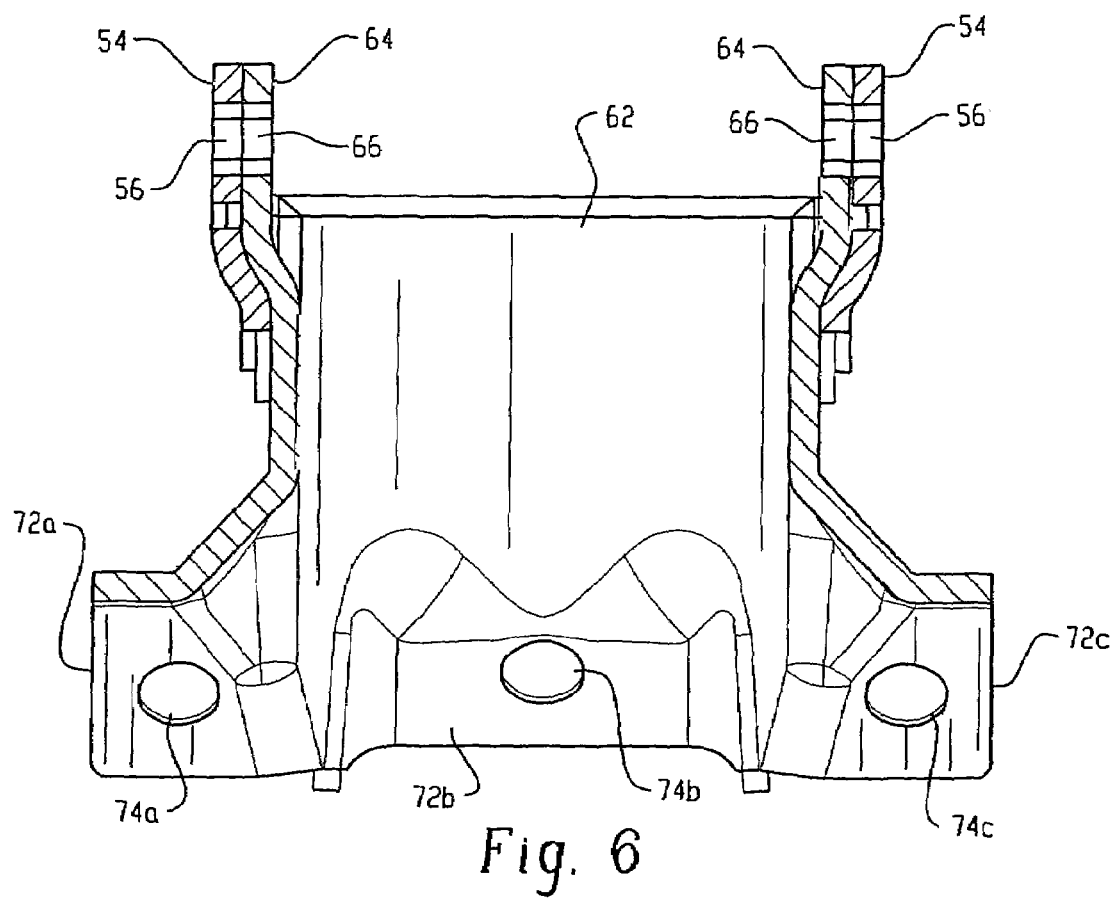
FIG. 6 is a cross-sectional view taken generally along lines 6-6 of FIG. 5.

As perhaps best illustrated in FIGS. 4 AND 5, the bracket portions 48, 50 are brought into mating engagement and secured together along the seam 68. This provides a unitary metal bracket capable of transferring high loads from the first surface to the second surface of the vehicle. The bracket is secured to one of these surfaces and, as will become evident from the following description, the damping assembly is secured to the other of these surfaces. As represented in FIG. 4, reference numerals 80a, 80b are representative of and illustrate a continuous path of metal, i.e., it does not cross the weld, from the support tabs 64 to respective mounting openings 74a, 74b, 74c. The location of the weld seam does not compromise the material integrity of the metal in accordance with the stress/load going through the bracket. There are always continuous, single thickness metal paths to the main stress/loads from the support tabs 64 to the mounting openings 74a-74c without having to pass through the weld seam. This provides a secure and durable design required for heavy load conditions such as truck applications.

Welding the first and second portions together provides an inexpensive way to manufacture the bracket. Thus, although its function of providing the desired structural strength leads to a relatively complicated configuration, this particular design can be easily manufactured. Moreover, the support portions 54, 64 provide a double thickness of metal at the areas of high stress concentration. The increased thickness of metal accommodates a large amount of stress and the continuous single thickness metal pads extending from the support tabs assure that the load is effectively transferred to the mounting openings. Consequently, the bracket design is unique in providing double thickness metal at locations of high stress concentration, in providing metal continuity from the support tabs to the frame attachment openings, and in providing overall bracket rigidity that provides high frequency for all modes (above 900 Hz).

With continued reference to FIGS. 1-6, and additional reference to FIGS. 7-10, the damping assembly G1 will be described in greater detail. Particularly, an elastomeric body 90 which is typically a natural or synthetic rubber is molded to mounting member 92 such as an aluminum structure. As is generally conventional, the mounting member includes first and second mounting means or studs 94. The studs are typically externally threaded to cooperate with threaded members such as fastening nuts 96 (FIG. 1) that secure the damping assembly to the first surface 30 of the vehicle. The mounting member 92 has a recess 98 formed therein and providing a generally U-shaped configuration as shown in cross-section. The recess is adapted to receive the travel limiter pin and sleeve therein, with opposite ends of the travel limiter pin secured to the mounting tabs of the bracket.

Figure 7:
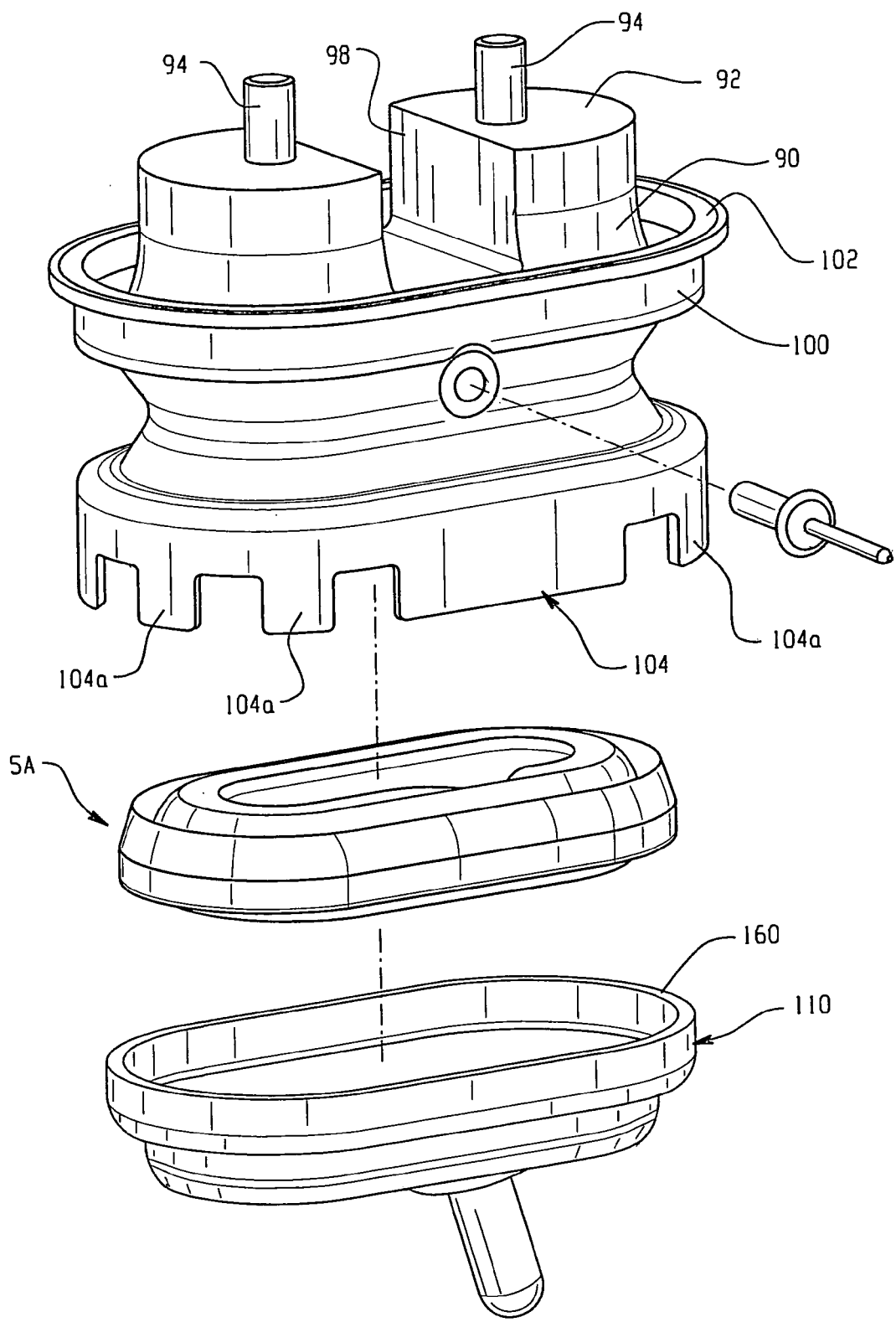
FIG. 7 is an exploded perspective view of the damping assembly.
Figure 8:
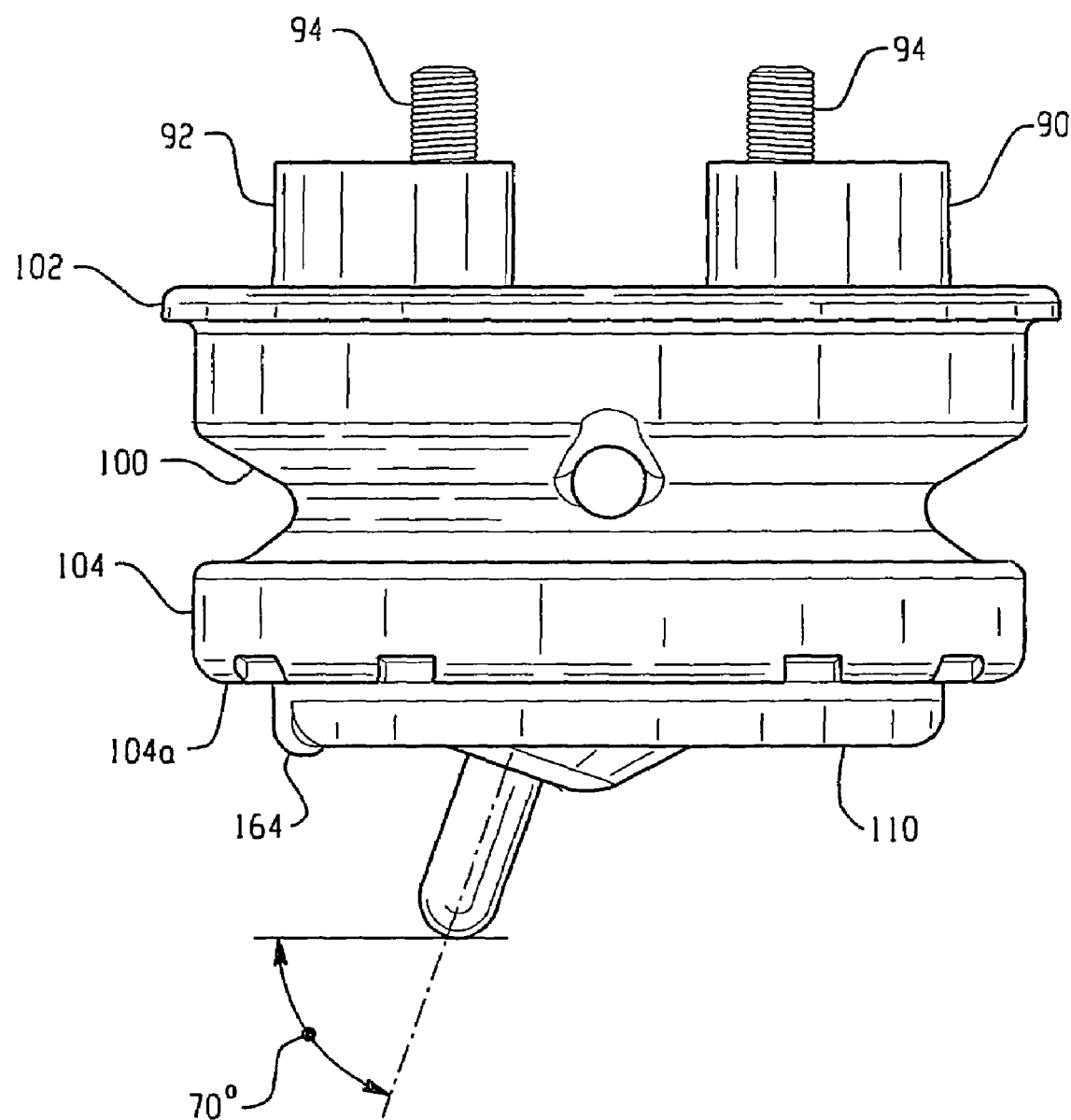
FIG. 8 is an elevational view of the assembled hydromount of FIG. 7.
Figure 11:
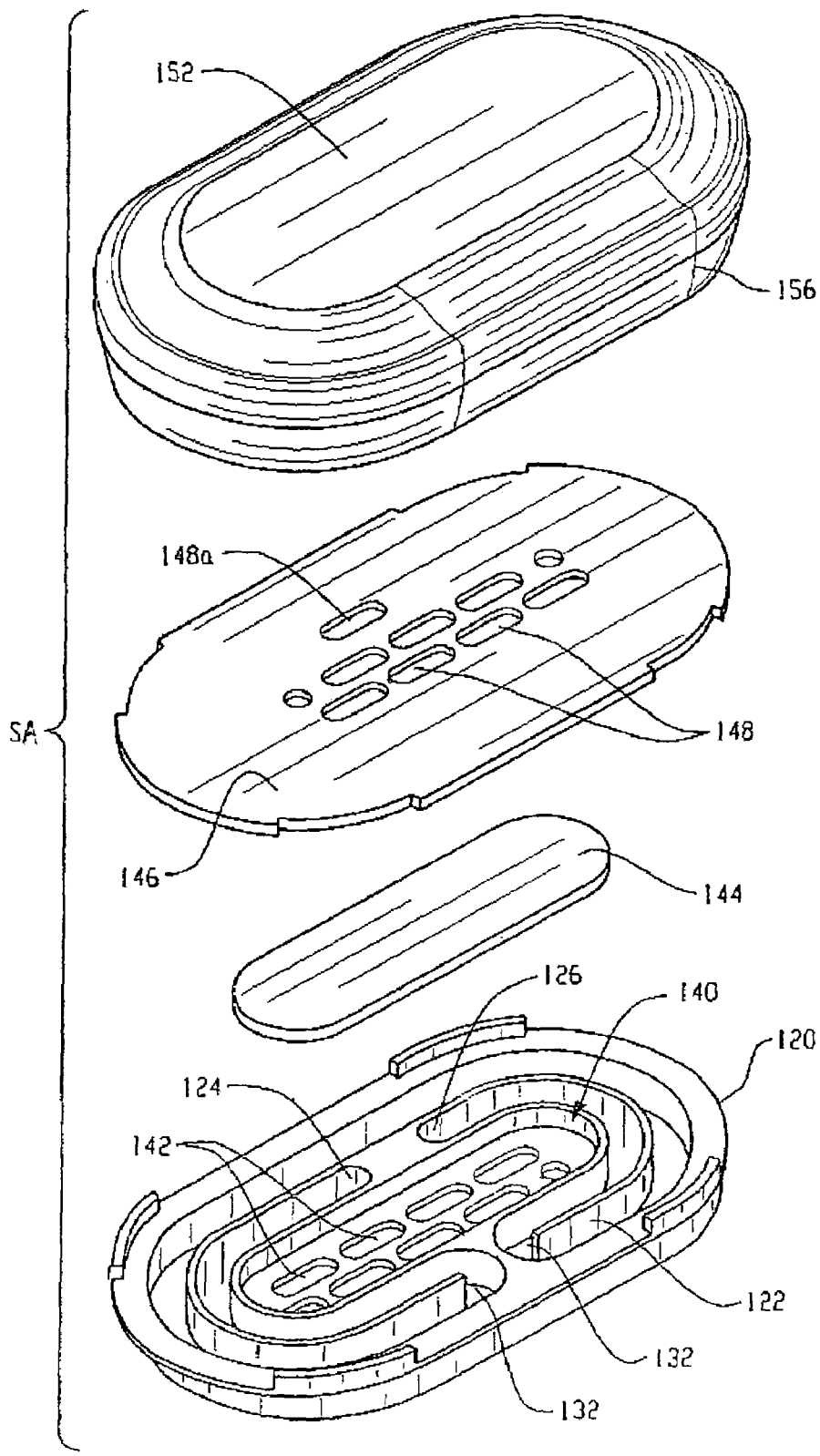
FIG. 11 is an exploded, perspective view of a fluid subassembly.

A metal retainer 100 is received around and secured to the outer periphery of the elastomeric body 90. A first end or upper edge of the retainer defines a metal flange 102 which cooperates with the bracket to form a portion of the structural strength feature G2 in conjunction with the bracket. A second or lower end 104 of the retainer is scalloped or configured to form individual tabs 104a that extend about the periphery of the generally oval-shaped retainer for secure interconnection with the lower shell 110. The lower shell is also generally oval-shaped and defines a lower bowl or cavity that receives a hydromount subassembly SA therein (FIG. 7). As will become more apparent below, the subassembly divides an interior chamber in the elastomeric body into first and second chambers between which a fluid, such as a propylene glycol solution or other similar fluid, is selectively transferred between the chambers to effect vibration damping.

Figure 14:
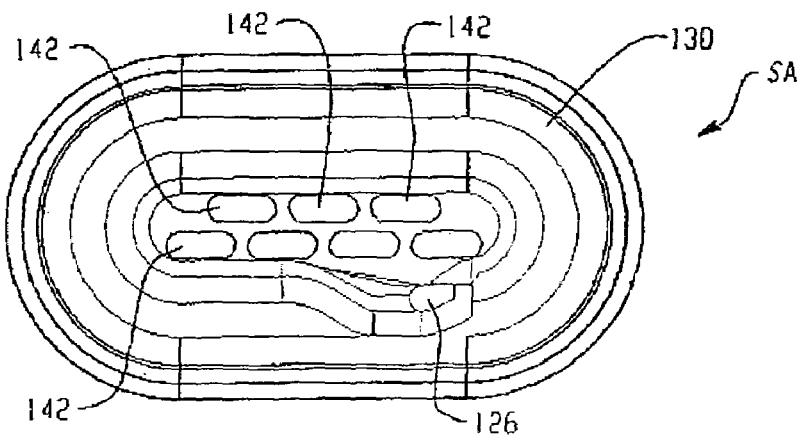
FIG. 14 is a bottom plan view of the subassembly of FIG. 12.
Figure 15:
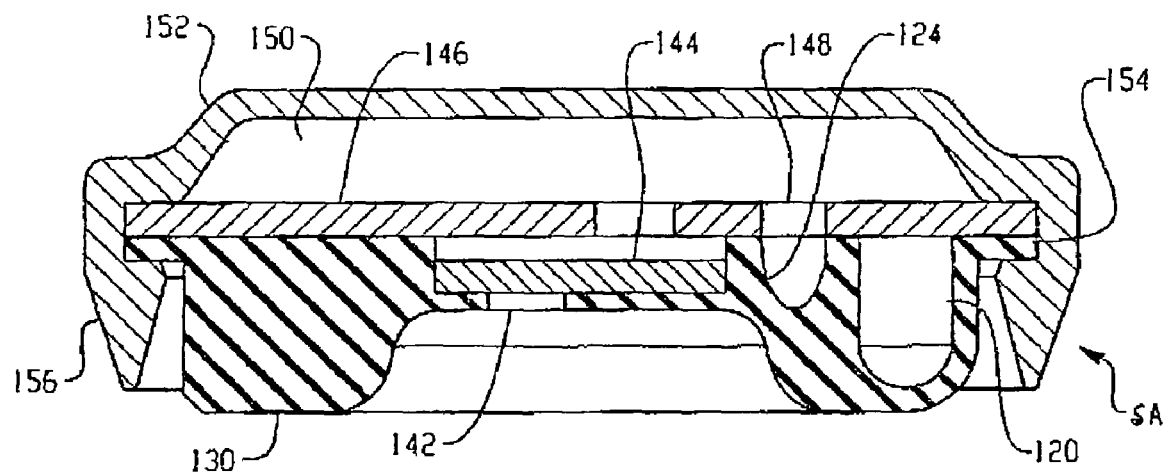
FIG. 15 is a cross-sectional view taken generally along lines 15-15 of FIG. 12.
Figure 16:
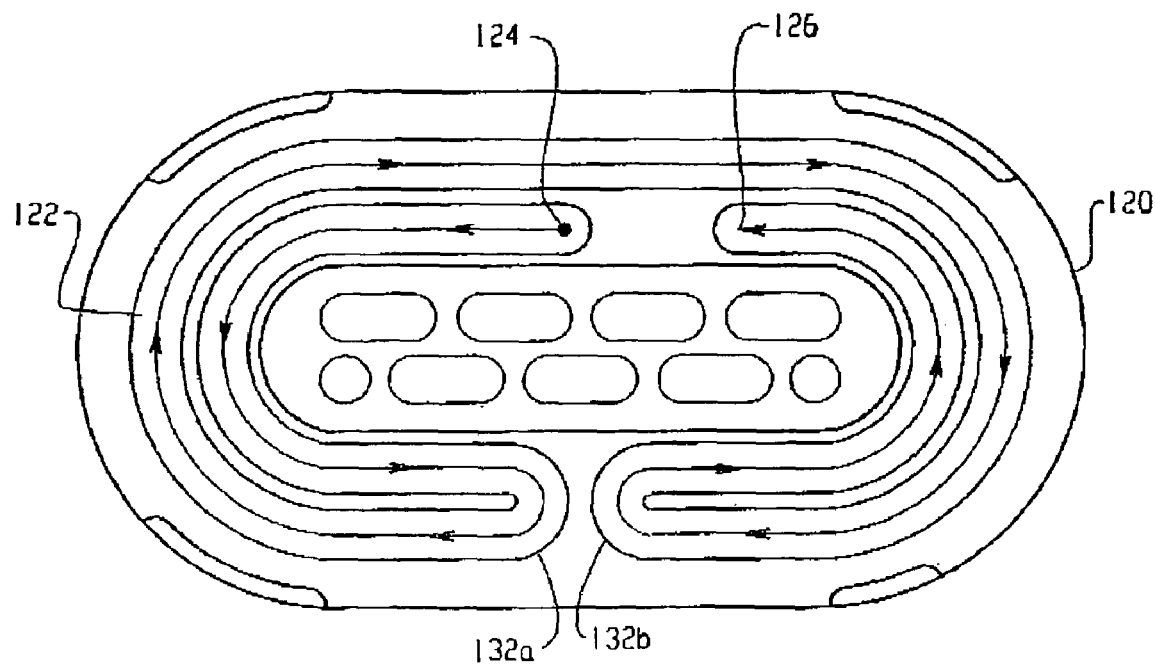
FIG. 16 is an enlarged detail view of the inertia track.

More particular details of the subassembly SA are shown in FIG. 11-16. It will be appreciated that the subassembly is shown in an inverted orientation in these figures relative to the orientation of the remaining figures, e.g. FIGS. 1-10. The subassembly includes an inertia track 120 having a double lap channel 122 that extends between a first end or track entry 124 and a second end or track exit 126. The track ends are provided in the same orbit, that is, in the same internal orbital section of the channel. In addition, two 180° turns 132 interconnect the internal orbital section of the channel with the external orbital section and thereby maximize the length of the channel. As fluid proceeds through the inertia track member via the entry 124, it proceeds leftward, then rightward as shown in FIG. 16 along the inner orbit of the channel before reaching the first 180° turn 132a. The fluid then transitions to the outer orbit of the channel and proceeds in a clockwise direction as illustrated. Before reaching the second 180° turn 132b, the fluid traverses a substantial perimeter of the inertia track member. Proceeding through the second 180° turn 132b brings the fluid back to the internal orbit. From there, it proceeds to the exit 128 of the channel and communicates through side 130 of the inertia track member (FIG. 14).

A central cavity 140 is also provided in the inertia track member. The cavity communicates through multiple openings 142 in the side 130 with the chamber defined by the elastomeric body of the damping assembly. A decoupler 144 is received in the cavity and held therein by cover plate 146. The cover plate also includes a series of openings 148 (opening 148a is aligned with the entry 124 of the channel) therethrough that communicate with the cavity 140 and with a subchamber 150 (FIG. 15) defined between the cover plate and bellows 152. The bellows is preferably formed of an elastomeric material, such as an EPDM, that includes an internal groove 154. The groove is dimensioned to clampingly engage outer perimeter portions of the cover plate when received in mating engagement with the inertia track. Shoulder 156 of the bellows holds the components of the subassembly together.

Figure 12:
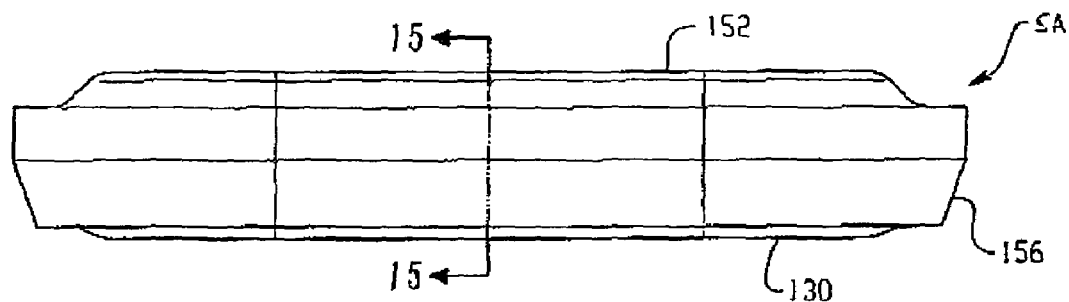
FIG. 12 is an elevational view of the assembled hydromount subassembly of FIG. 11.
Figure 13:
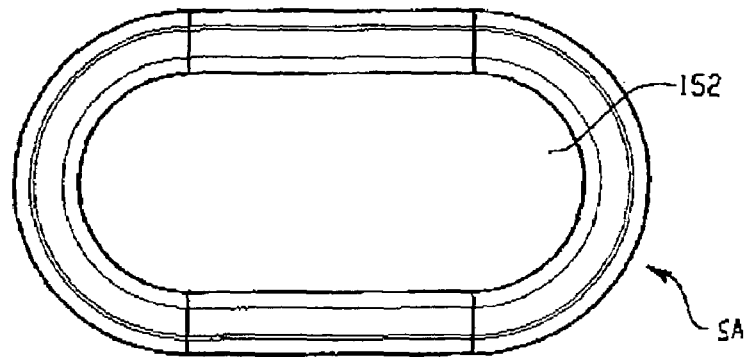
FIG. 13 is a top plan view of the subassembly of FIG. 12.

As illustrated in FIGS. 12 and 15, the subassembly defines a distinct, assembled unit dimensioned for receipt within the elastomeric body. As is generally known in the art, displacement of the elastomeric body in a downward direction (downward in relation to FIGS. 1, 9 and 10), reduces the size of the chamber and urges fluid contained therein through either the hydromount channel or through the cavity 140 depending on the amplitude and frequency of the vibrations. If the displacement is relatively small in amplitude, the fluid flows within the cavity 140 and is responsive to small vibratory amplitudes at low frequencies. At a desired amplitude level, however, the fluid urges the decoupler against the cover plate and thereby blocks communication movement within the cavity 140 and the fluid is forced through the elongated channel 122 to effect damping of the vibration.

Figure 17:
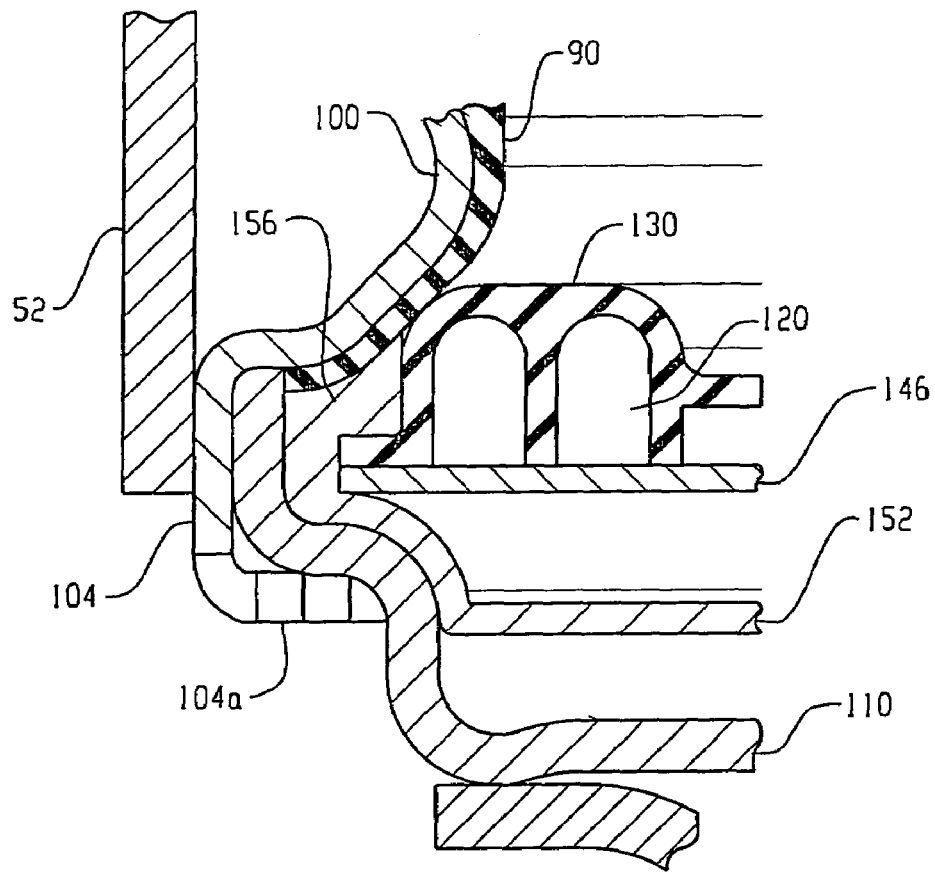
FIG. 17 is an enlarged detail view of the metal-to-metal path/lock that seals the outer lower shelf or armature to the diaphragm/bellows and upper shell/cover.
Figure 18:
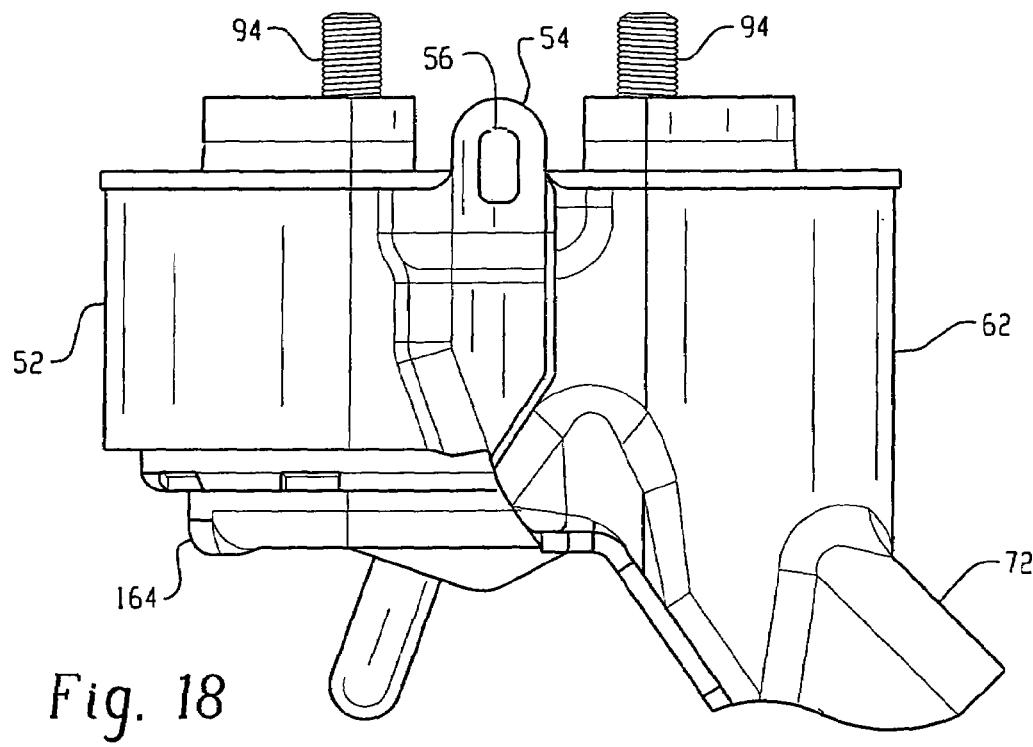
FIG. 18 is an elevational view of the assembled vibration isolator assembly.
Figure 19:
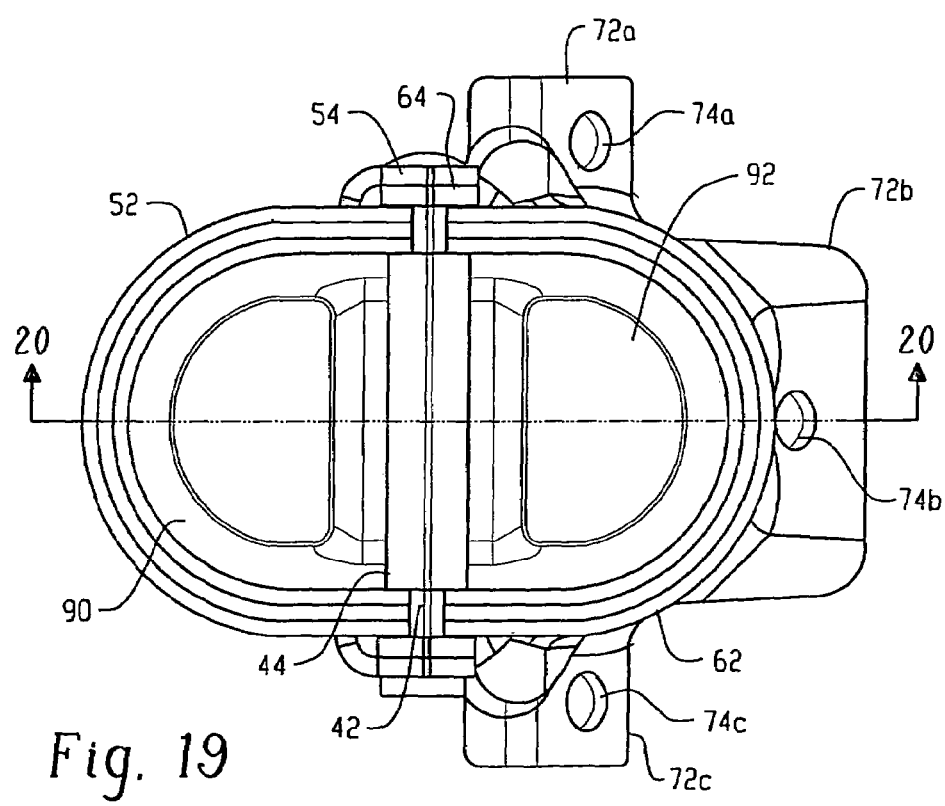
FIG. 19 is a top plan view of the assembly of FIG. 18.
Figure 20:
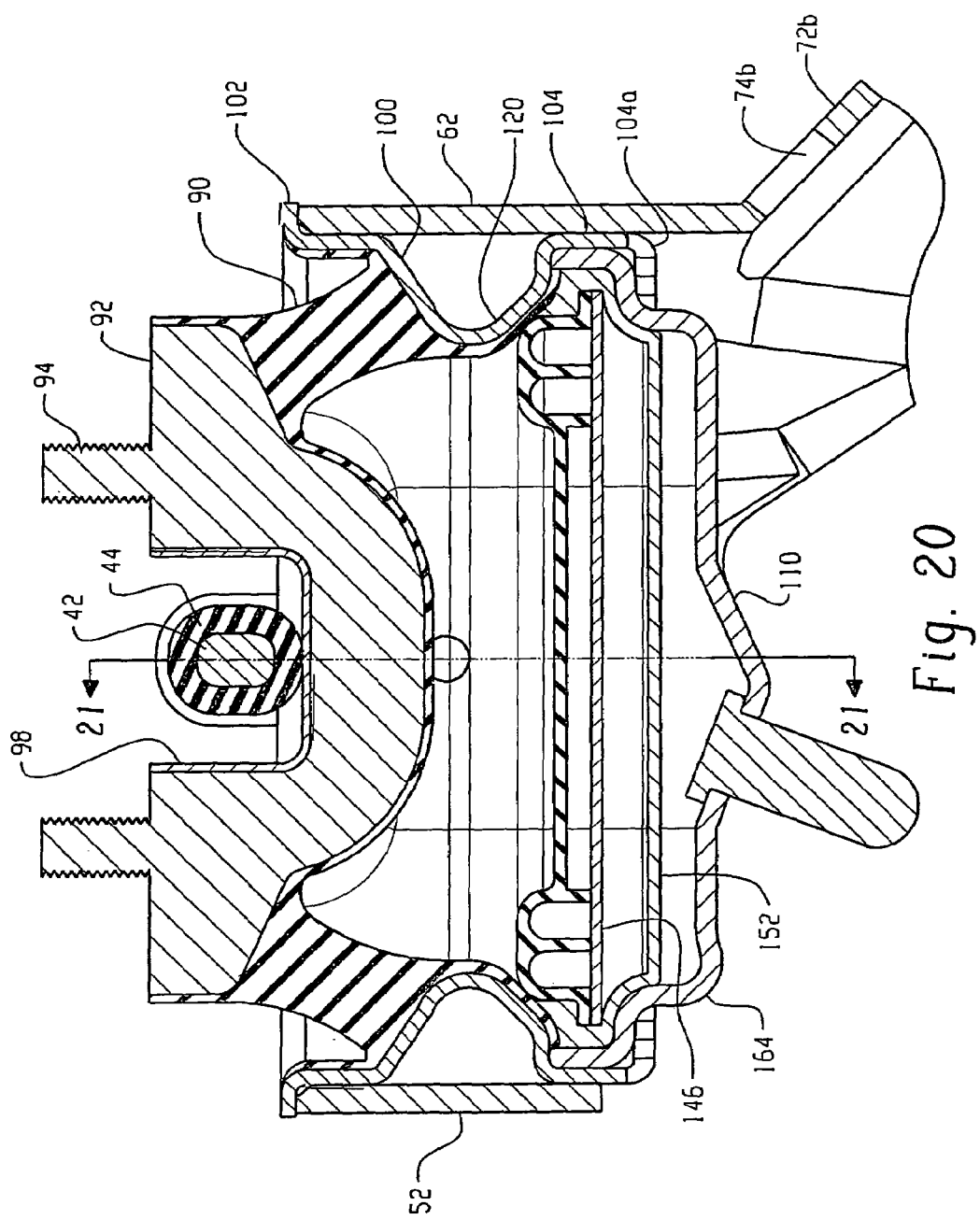
FIG. 20 is a longitudinal cross-section taken generally along lines 20-20 of FIG. 19.
Figure 21:
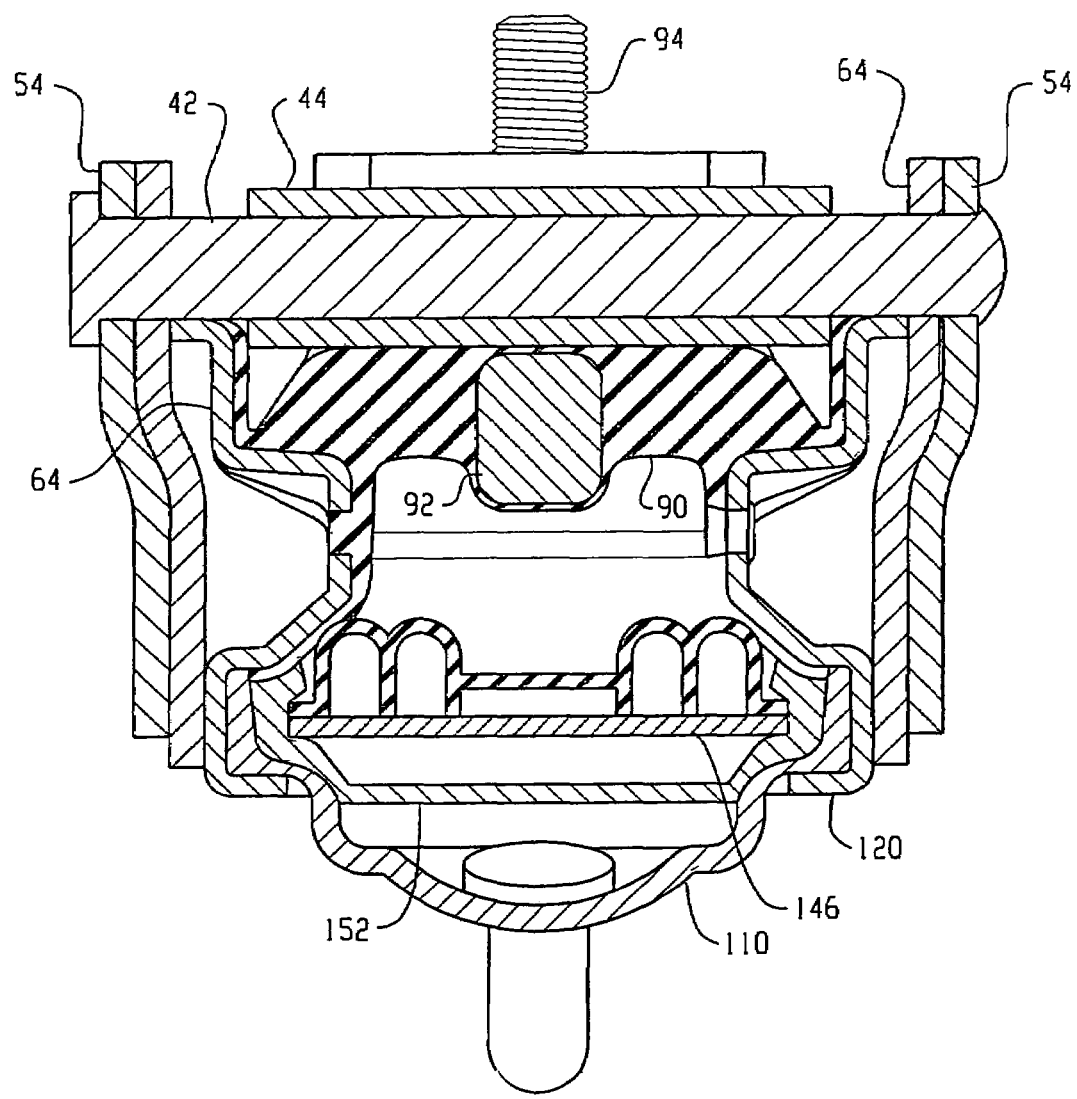
FIG. 21 is a cross-sectional view taken generally along the lines 21-21 of FIG. 20.

The periphery of the subassembly is received between the lower shell 110 and the retainer 100. As particularly illustrated in FIG. 17, a robust fluid seal is thus provided among the lower shell 110, the periphery of the bellows 152, and the retainer 100. As is perhaps best appreciated from FIGS. 7 and 17, the lower plate 110 receives the subassembly SA therein, and a perimeter collar 160 extends slightly higher than the height of shoulder 156 of the bellows. The tabs 104a provided at peripherally spaced locations around the lower end 104 of the retainer are then crimped to secure the subassembly in place and divide the chamber of the elastomeric body 90. As shown in FIG. 17, metal-to-metal contact is thus achieved between the retainer 100 and the lower shell 110. Although the perimeter of the subassembly is held between the retainer and the lower shell, substantially all of the load carrying capability is passed through the metal-to-metal contact and bypasses the subassembly. This provides a structurally stiffer arrangement at the crimping area contributing to the overall mounting assembly stiffness. It also permits the inertia track to be formed of a material other than metal or the subassembly SA removed as an option, if desired, without compromising the assembly integrity. That is, the remainder of the damping assembly structural relationship is unaffected if the subassembly is removed from the vibration isolator assembly. Typically, metal is used in prior arrangements because of the need to carry some of the forces therethrough. As noted above, however, the exo-skeleton formed by the bracket and the metal-to-metal interface of the retainer and lower shell assure that the forces need not travel through the subassembly.

FIGS. 18-21 illustrate the insertion or assembly of the damping assembly into the exo-skeleton bracket. Thus, as evident in FIGS. 18, 20, and 21, substantially more than fifty percent (50%) of the elastomeric body 90 is received within the sidewall of the bracket. The lower end 104 of the retainer is radially received within the inner periphery of the bracket so that a metal-to-metal contact of the retainer within the bracket provides a press-fit relation that also maximizes stiffness. The radially extending metal flange 102 of the retainer abuttingly engages against the upper edge of the bracket. An upper shell 162 is received over the damping assembly portion that extends outwardly from the bracket. Opposite ends 162a, 162b of the upper shell abuttingly engage the first surface 30 of the vehicle and the metal flange 102 of the damping assembly. Thus, metal-to-metal contact is established from the first surface 30, the upper shell 162, the metal flange 102 of the damper assembly, the bracket, to the second surface 32 of the vehicle.

Once seated therein, the travel limiter assembly is inserted transversely through the aligned openings 56, 66 in the support tabs of the bracket. The travel limiter assembly passes through the recess 98 in the damping assembly as illustrated in the FIGURES. Thus, the travel limiter assembly limits vertical upward movement of the elastomeric body and by virtue of the elastic sleeve 44, also provides support in other directions. Prior art arrangements use a travel limiter feature, but are typically missing one of the vertical directions, either up or down. This resulted from the fact that the vertical stop is controlled in the prior art by internal contact between the core and the inertia track. In the present invention, the inertia track is not used as a vertical stop since major stresses would otherwise be transmitted therethrough. The inertia track is a sensitive component of the mount and any failure of the track can result in fluid leakage between the working and compensation fluid chambers. Also, the sealing area of the mount can be damaged and some fluid leakage could occur through the side of the mount. With the present invention, however, the travel limiter assembly with a removable sleeve allows the shape of the travel limiter to be selectively changed, e.g., circular or oval cross-section, for instance, and/or changing the rubber thickness and/or the hardness of the sleeve, allows the rate of the mount to be easily changed and adapted to a variety of applications while using substantially the same mount. Therefore, the mount rates, i.e., large displacement conditions, depend primarily on the combined tuning of the travel limiter pin and the rubber sleeve.

Still another feature of the present invention is found in the interface between the lower shell 110 of the damping assembly and the surface of the vehicle. As perhaps best illustrated in FIG. 1, the mounting openings in the bracket are selectively aligned with the openings in the second surface 32 of the vehicle. The lower shell typically has an elongated inner face or surface area that mates with the surface area on the vehicle. This is potentially prone to misalignment, and potential rattling. Here, a local contact 164 is provided through a lower surface of the shell. The local contact provides a purposeful interrupt between the generally planar surfaces so that the load is transferred through a controlled and well-defined surface area.

In summary, the vibration isolator assembly satisfies the packaging and load requirements by purposefully designing the damping and structural features as different components and subsequently integrating them together. The fluid mount is spared the heavy loads encountered in prior art arrangements. The path of the track is also unique. It is not simply a double track, but employs reverse curves in two locations of the channel to maximize the length of the track. Contact between the bracket and the vehicle is also improved to provide better noise vibration handling and reduce the prospects of secondary resonation. Use of the exo-skeleton design allows the subassembly to be formed from different materials at a lower cost since the forces are transmitted around the outside of the subassembly rather than through it. Still another important advantage is the ability to tune the deflection versus load characteristics of the mount by simply altering the travel limiter pin and/or sleeve. Merely changing the shape of the travel limiter pin, or changing the rubber thickness or hardness of the sleeve, can very easily change the rate range of the hydromount under more extreme conditions such as open throttle operation or abusive, off-road vehicle conditions without altering the elastomeric body and the remainder of the structure. This provides a practical way to tune the assembly as desired by a particular customer.

The invention has been described with reference to the preferred embodiment and method. Obviously, modifications and alterations will occur to others upon reading and understanding the preceding detailed description. It is intended that the invention be construed as including all such modifications and alterations.

The invention claimed is:

1. A vibration isolator assembly interposed between associated first and second surfaces of a vehicle, the assembly comprising:

a structural exo-skeleton bracket dimensioned to extend between the associated first and second surfaces for transferring forces therethrough, the bracket including means for securing the bracket to one of the associated first and second surfaces, wherein the bracket includes first and second bracket portions each including travel limiter support portions that receive a travel limiter therein that limits travel of an elastic wall portion of the damping assembly, the travel limiter support portions providing a double thickness wall at an attachment region with the travel limiter; and a damping assembly received in the exo-skeleton bracket that is protected from the transferred forces by the exo-skeleton bracket, the damping assembly including the elastic wall portion secured to a metal retainer and a shell forming a housing, the elastic wall portion having a major portion of its periphery received in the exo-skeleton, bracket, and means for securing the damping assembly to the other of the associated first and second surfaces; and a subassembly received therein and separating first and second chamber portions, the subassembly including
an inertia track assembly including a housing having an elongated channel with first and second ends in fluid communication between opposed first and second surfaces thereof, respectively, and at least one opening that is also in fluid communication between the first and second surfaces thereof,
a diaphragm received adjacent the at least one opening of the inertia track assembly, and
an elastomeric member overlying the inertia track assembly.

2. The vibration isolator assembly of claim 1 wherein the bracket includes first and second bracket portions, the first bracket portion having a continuous surface extending between the travel limiter support portion and the securing means.

3. The vibration isolator assembly of claim 2 wherein the first and second bracket portions are joined along a seam offset from the continuous surface.

4. The vibration isolator assembly of claim 2 wherein the securing means includes spaced attachment points.

5. The vibration isolator assembly of claim 1 further comprising a travel limiter assembly that limits movement of the damping assembly, the travel limiter assembly including a resilient portion that tunes the force versus displacement ratio of the vibration isolator assembly.

6. The vibration isolator assembly of claim 1 wherein the damping assembly includes an elastic wall portion and a shell forming a housing, the housing including first and second chambers divided by an elongated channel that permits selective communication between the first and second chambers.

7. The vibration isolator assembly of claim 1 wherein the subassembly further comprises a cover plate received over the inertia track assembly having an opening extending therethrough in fluid communication with the first end of the inertia track channel, and dividing the subassembly into first and second subchambers.

8. The vibration isolator assembly of claim 7 wherein the cover plate further comprises at least one further opening that extends therethrough.

9. The vibration isolator assembly of claim 8 wherein the diaphragm is interposed between the at least one opening in the inertia track assembly and the cover plate.

10. The vibration isolator assembly of claim 7 wherein the first subchamber is located between the elastomeric member and the cover plate.

11. The vibration isolator assembly of claim 10 wherein the second subchamber is located between the cover plate and the inertia track assembly.

12. The vibration isolator assembly of claim 1 wherein the first chamber portion is enclosed by a first elastomeric wall member and the subassembly.

13. The vibration isolator assembly of claim 1 wherein the channel has a circuitous path that includes first and second 180° portions that interconnect inner and outer orbits of the channel.

14. The vibration isolator assembly of claim 1 wherein the subassembly is selectively removable from the damping assembly without compromising assembly integrity of the damping assembly.

15. The vibration isolator assembly of claim 1 wherein the damping assembly includes a fluid mount having an elastic wall portion and a shell forming a housing, the shell having a local contact that abuttingly engages one of the associated first and second surfaces to limit vibration therebetween.

16. A vibration isolator assembly interposed between associated first and second surfaces of a vehicle, the assembly comprising:
    a structural exo-skeleton bracket dimensioned to extend between the associated first and second surfaces for transferring forces therethrough, the bracket including means for securing the bracket to one of the associated first and second surfaces; and
    a damping assembly received in the exo-skeleton bracket that is protected from the transferred forces by the exo-skeleton bracket, the damping assembly including an elastic wall portion secured to a metal retainer and a shell forming a housing, the elastic wall portion having a major portion of its periphery received in the exo-skeleton, bracket, and means for securing the damping assembly to the other of the associated first and second surfaces;
    a subassembly received therein and separating first and second chamber portions, the subassembly including
        an inertia track assembly including a housing having an elongated channel with first and second ends in fluid communication between opposed first and second surfaces thereof, respectively, and at least one opening that is also in fluid communication between the first and second surfaces thereof,
        a diaphragm received adjacent the at least one opening of the inertia track assembly, and
        an elastomeric member overlying the inertia track assembly; and
    a travel limiter assembly that limits movement of the damping assembly, the travel limiter assembly including a rubber sleeve received thereover that tunes the force versus displacement ratio of the vibration isolator assembly.

* * * * *